United States Patent [19]

Spoo et al.

[11] Patent Number: 5,198,172
[45] Date of Patent: Mar. 30, 1993

[54] METHOD OF PULTRUDING UTILIZING A DIE WITH CHANGEABLE DIE INSECTS

[75] Inventors: Kevin J. Spoo; Vergil H. Rhodes, Jr; Bill W. Dodd, all of Bartlesville, Okla.

[73] Assignee: Phillips Petroleum Company, Bartlesville, Okla.

[21] Appl. No.: 887,979

[22] Filed: May 22, 1992

Related U.S. Application Data

[62] Division of Ser. No. 556,679, Jul. 23, 1990, Pat. No. 5,116,450.

[51] Int. Cl.⁵ .................. B32B 27/04; B29C 33/22
[52] U.S. Cl. ............................. 264/219; 264/258; 156/180; 156/245; 29/401.1; 29/463; 29/464
[58] Field of Search ............. 156/441, 180, 181, 166, 156/433, 500, 245, 242; 425/465, 192 R, 185, 411, 128; 264/135, 136, 174, 166, 219, 258; 29/401.1, 463, 464

[56] References Cited

U.S. PATENT DOCUMENTS

3,378,884 4/1968 Meteer .......................... 264/166
5,132,070 7/1992 Paul et al. .................. 264/166 X Primary Examiner—Jeff H. Aftergut
Attorney, Agent, or Firm—William R. Sharp

[57] ABSTRACT

A molding apparatus and method are provided which are of the type which utilize a die set comprising at least one die which defines at least one mold cavity for receiving resin impregnated fibers therethrough. Any one die of the die set comprises first and second mold base sections which are positionable with respect to one another so as to form a mold base which defines a channel therethrough. A mold insert defines a mold cavity completely therethrough and is adapted to be removably mounted in the channel. The die set is removably clamped between first and second clamp members so as to enable easy and convenient addition or removal of dies to or from the die set if desired.

31 Claims, 6 Drawing Sheets

METHOD OF PULTRUDING UTILIZING A DIE WITH CHANGEABLE DIE INSECTS

This is a divisional of application Ser. No. 556,679, filed Jul. 23, 1990, now U.S. Pat. No. 5,116,450.

BACKGROUND OF THE INVENTION

This invention relates to a molding apparatus and method, and is particularly applicable to pultrusion molding.

According to prior art pultrusion processes, multiple resin impregnated fibers are pulled through a mold cavity as defined by at least one pultrusion die. This causes consolidation of the resin impregnated fibers and consequent molding of the final article to the desired shape. Most preferably, the resin impregnated fibers are first passed through a "hot" die, in which most if not all of the consolidation takes place, and are then passed through a "cooling" die in which the molded article is cooled.

Heretofore, the versatility of pultrusion die equipment has been very limited. For example, if a different molded shape was desired, new dies would be fabricated which define mold cavities of the desired shape. Fabrication of such new dies is very labor intensive as well as expensive. Or, if simultaneous production of multiple pultruded articles was desired, additional dies were positioned in a side-by-side relationship. However, such multiple article production required time consuming alignment of each of the additional dies.

SUMMARY OF THE INVENTION

It is, therefore, an object of the invention to provide a molding apparatus and method which are easily adaptable to different mold shapes and die arrangements.

The above object is realized by a molding apparatus of the type which includes a die set comprising at least one die which defines at least one mold cavity for receiving resin impregnated fibers therethrough, wherein: any one die of the die set comprises first and second mold base sections which are positionable with respect to one another so as to form a mold base which defines a channel therethrough, and further comprising a mold insert which defines a mold cavity completely therethrough from its inlet end to its outlet end and which is adapted to be removably mounted in the channel; and wherein the apparatus further comprises a clasp means which includes a first clamp member and a second clamp member, and which is adapted to removably clamp the die set between the first and second clamp members.

According to another aspect of the invention, there is provided a molding method comprising: assembling a die set comprising at least one die by positioning, with respect to any die of the die set, first and second mold base sections relative to one another so as to form a mold base defining a channel therethrough in which there is removably mounted a mold insert having an inlet end and an outlet end and defining a mold cavity which extends completely therethrough from the inlet end to the outlet end; removably clamping the die set between a first clamp member and a second clamp member; and passing resin impregnated fibers through each mold cavity of the die set so as to at least partially consolidate the resin impregnated fibers.

The invention as described above is particularly advantageous in at least two respects. First, the mold insert is removably mounted so as to permit its replacement with a mold insert having a different shaped or dimensioned mold cavity. Therefore, the mold cavity can be changed without fabricating a new die. Second, the clamp members permit additional dies to be positioned between the clamp members, after which all dies of the die set are clamped between the clamp members. Since the various dies of the die set are clamped together in this fashion, there is no need to align the additional dies. These and other advantages of the invention will be discussed in the Detailed Description which describes a preferred embodiment of the invention employing two "hot" die sets and a "cooling" die set. In particular, this preferred embodiment employs longitudinally positioned heating elements and a means for effectively cooling the cooling die set which increase achievable line speeds.

DETAILED DESCRIPTION OF THE INVENTION

An embodiment of the invention will now be described with respect to a pultrusion apparatus for pultruding a generally cylindrical rod. It should be understood, however, that the invention is applicable to molding of articles of any desired shape.

Figure 1:
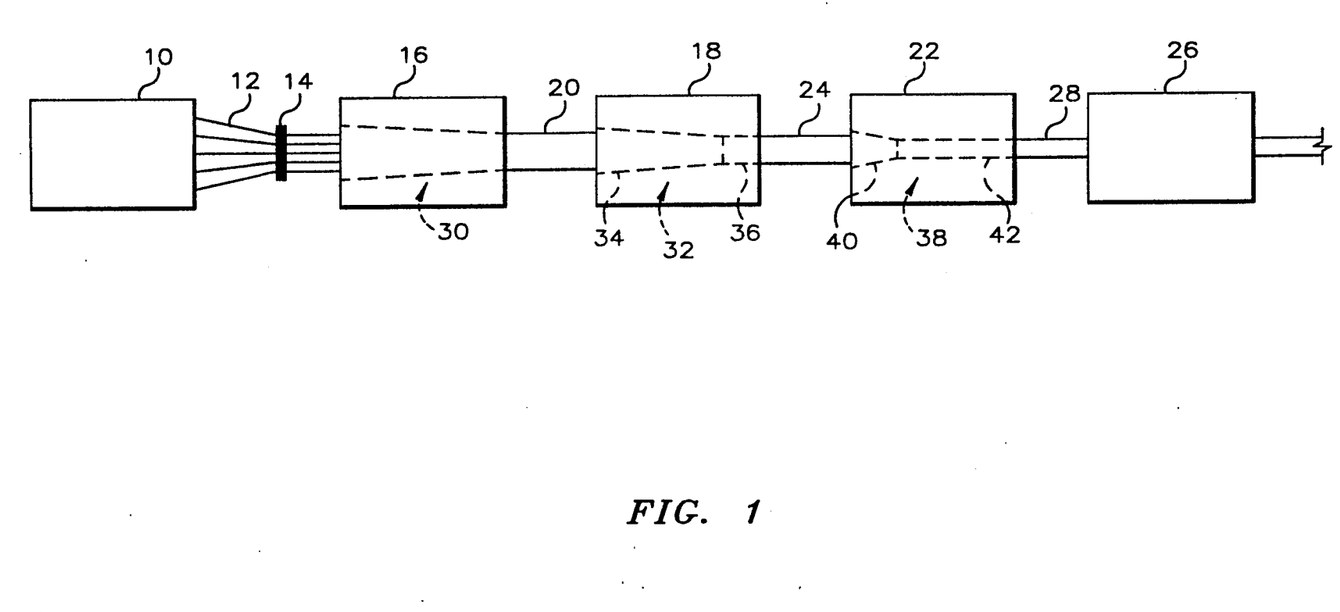
FIG. 1 is a schematic illustration of a pultrusion apparatus which employs two "hot" die sets and a third "cooling" die set.

Referring to FIG. 1, this FIGURE schematically illustrates a pultrusion apparatus wherein broken lines indicate the shapes of various mold cavities. The illustrated apparatus includes: a creel 10 for supplying resin impregnated fibers as indicated at 12; a guide or preformer 14 for guiding and converging the resin impregnated fibers; a first "hot" die set 16 which receives the resin impregnated fibers at its inlet end; a second "hot" die set 18 which receives the partially consolidated resin impregnated fibers 20 at its inlet end from the outlet end of die set 16; a third "cooling" die set 22 which receives the further consolidated resin impregnated fibers 24 at its inlet end from the outlet end of die set 18; and a pulling means 26, of the type well known to those skilled in the art, for pulling the finally consolidated molded article 28 from the outlet end of die set 22, thus pulling the resin impregnated fibers from creel 10 and through the various die sets.

The resin impregnated fibers as supplied from creel 10 can be in the form of multiple "prepreg" tapes which comprise the resin impregnated fibers. Alternatively, the pultrusion apparatus can be provided with means to impregnate strands of fibers with resin. For example, fiber strands can be pulled through a resin bath where the fibers are impregnated with resin, after which the resin impregnated fibers are pulled through a suitable dryer and into and through the various die sets. Such a system which includes a resin bath, dryer, etc. is described in U.S. Pat. No. 4,680,224 of O'Connor.

Note that the boxes referenced by numerals 16, 18 and 22 represent die sets which can each comprise one or more dies. When it is desired to simultaneously produce a number of pultruded articles, a corresponding number of dies can be positioned in a side-by-side relationship in each die set.

With respect to the mold cavities defined by the various die sets, die set 16 defines at least one mold cavity 30 which tapers from an inlet diameter to a smaller outlet diameter. Die set 18 preferably defines at least one mold cavity 32 which includes a first, tapered portion 34 which tapers from an inlet diameter to a second portion 36 of substantially constant cross-sectional area. Second portion 36 extends to the outlet end of die set 18 and is preferably shorter in length than the first, tapered portion 34. Die set 22 preferably defines at least one mold cavity 38 which includes a first, tapered portion 40 which tapers from an inlet diameter to a second portion 42 of substantially constant cross-sectional area. Second portion 42 extends to the outlet end of die set 22 and is preferably longer than the first, tapered portion 40.

Before pultruding an article using the apparatus of FIG. 1, it is desirable to first align die sets 16, 18 and 22 such that the longitudinal axes of their respective mold cavities precisely coincide with one another. This is typically a tedious and time consuming process which involves extending a string line through the mold cavities, repeated adjustment of the die sets, and close-tolerance measurements to assure precise centering of the string line in each of the mold cavities.

Line speed through the various die sets generally ranges from about 1 to about 50 inches/minute. The line speed is dependent at least in part upon factors such as the size, geometry and composition of the pultruded article. By way of example, the maximum line speed achievable in pultruding a 3/16 inch diameter rod can be as much as four times greater than the maximum line speed achievable when pultruding a ½ inch diameter rod.

In regard to temperatures of the various die sets, the temperature of each of the "hot" die sets 16 and 18 is preferably sufficient to soften the resin sufficiently to achieve the desired consolidation within the respective mold cavities. Typically, die sets 16 and 18 will be maintained at a temperature in the range of from about 10° C. to about 100° C. above the softening point of the particular resin employed. A temperature differential is preferably maintained between the inlet and outlet ends of "cooling" die set 22. The inlet end of die set 22 is preferably maintained at a temperature below the softening point of the resin but considerably above ambient temperature. Final consolidation of the resin impregnated fibers can be achieved in the tapered portion 40 of mold cavity 38 because the cooling of the partially consolidated resin impregnated fibers causes the material to shrink and pull away from the surfaces defining the mold cavity. The outlet end of die set 22 is preferably maintained at a temperature considerably less than the inlet end of die set 22 and near ambient temperature if possible. Means for maintaining the die sets at the above described temperatures will be discussed below with reference to subsequent FIGURES.

Suitable thermoplastic resins useful in the invention are well known and include polyolefins, polyesters, polycarbonates, polyamides and aromatic sulfide polymers from the poly(arylene sulfide) (PAS) family. The last mentioned PAS polymers are particularly preferred in accordance with the invention and are noted for their excellent chemical resistance, good thermostability, and physical strength. A particular PAS polymer, poly(phenylene sulfide), has been employed with good results. One type of suitable poly(phenylene sulfide) (PPS) is a commercial engineering thermoplastic resin that is semi-crystalline in nature with a glass transition temperature of about 85° C. and a crystalline melting point of about 285° C. sold under the trademark RYTON ® by Phillips 66 Company of Bartlesville, Okla.

Where poly(phenylene sulfide) is used as the resin, die sets 16 and 18 are preferably maintained at a temperature in the range of about 310° C. to about 400° C. The inlet end of die set 22 is preferably maintained at a temperature of about 130° C. to about 200° C., and the outlet end of die set 22 is preferably maintained at a temperature of about 20° C. to about 100° C.

The fiber reinforcement suitable for use in the present invention can be selected from a wide variety of materials. The only constraint is that the fiber must not decompose or melt at or below the processing temperature for the resin selected. For poly(arylene sulfide) resins, glass, carbon and aramid fibers are most preferred.

Figure 2:
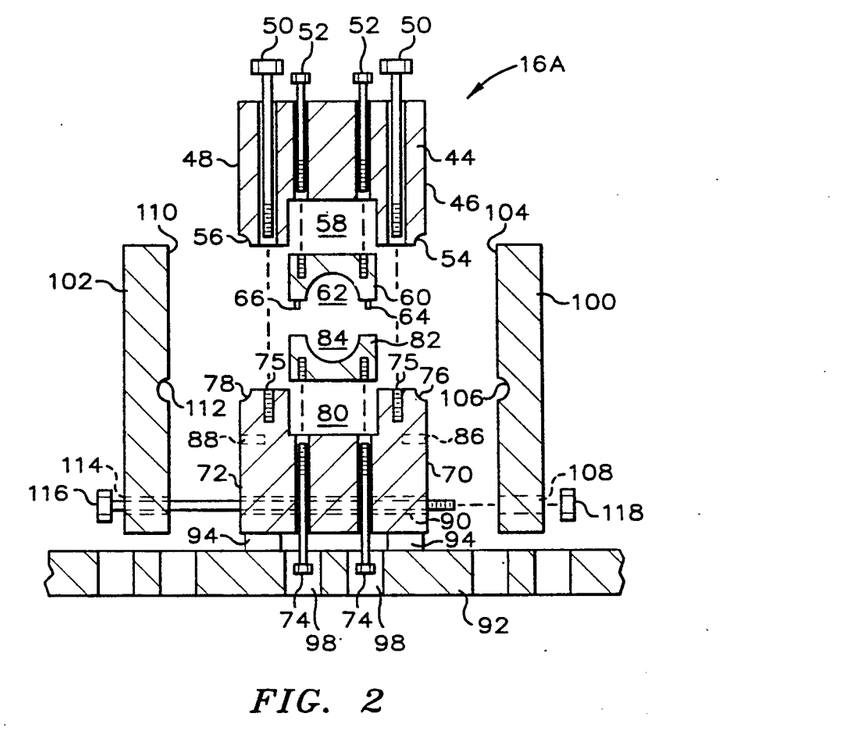
FIG. 2 is an exploded cross-sectional view of the first hot die set, which in this FIGURE includes only a single die, and associated clamp plates and mounting plate which shows various components in disassembled form.

Referring to FIG. 2, die set 16 is illustrated as including a single die 16A. Die 16A includes a mold base section 44 which has opposing faces 46 and 48, and a plurality of passages therethrough which are adapted to receive a corresponding plurality of bolts 50 and bolts 52. Mold base section 44 further defines quarter circular passage portions 54 and 56, and also a channel portion 58. Mold insert section 60 is adapted to be received in channel portion 58 so as to be removably connected to mold base section 44 by means of bolts 52 and corresponding threaded holes in mold insert section 60. As shown, mold insert 60 defines therethrough a mold cavity portion 62, along each side of which extend faces which have alignment pins 64 and 66 extending therefrom. The function of these alignment pins will be further discussed with reference to subsequent FIG. 6.

Die 16A further includes a mold base section 68 which has opposing faces 70 and 72, and also a plurality of passages for receiving a corresponding plurality of bolts 74. Mold base section 68 further has threaded holes as indicated at 75 which are adapted to align with and receive bolts 50 so as to removably connect mold base section 44 to mold base section 68 to form a mold base. In a similar manner to mold base section 44, mold base section 68 defines a pair of quarter circular passage portions 76 and 78 and further defines a channel portion 80. Channel portion 80 is adapted to receive a mold insert section 82 so as to be removably connected to mold base section 68 by means of bolts 74 and threaded holes in mold insert section 82. Mold insert section 82 also defines a mold cavity portion 84, along each side of which extend faces which are adapted to mate with corresponding faces of mold insert section 60. Finally, mold base section 68 defines, as shown in broken lines, a pair of opposing alignment holes 86 and 88, which are not used in FIG. 2 but which are further discussed with reference to subsequent FIG. 10, and also a passage 90 which extends from one opposing face 70 to the other opposing face 72 of mold base section 68. Another passage similar to passage 90 is provided but is not shown in FIG. 2.

Also shown in FIG. 2 is a mounting plate 92. Mold base section 68 can be connected to mounting plate 92 by means shown in subsequent FIG. 3, and is preferably spaced from mounting plate 92 by means of feet 94. Such feet are desirable to minimize thermal contact between mold base section 68 and mounting plate 92. The other die sets shown in FIG. 1 can be similarly positioned upon and connected to mounting plate 92 in alignment with one another. Mounting the various die sets in this regard on mounting plate 92 conveniently avoids the alignment process each time the apparatus is set up for pultrusion. Access holes 98 are provided through mounting plate 92 in order to access bolts 74. Additional access holes are shown on either side of holes 98 and are provided for additional dies as will be discussed with reference to FIG. 10. Of course, mounting plate 92 is preferably positioned upon suitable supports (not shown) such that the access holes are not blocked.

The appartus of FIG. 2 further comprises clamp plates 100 and 102 for clamping the die 16A therebetween. Clamp plate 100 has an inner surface 104, a semicircular passage portion 106 which extends along inner surface 104, and a passage 108. Similarly, clamp plate 102 has an inner surface 110, a semi-circular passage portion 112, and a passage 114. Bolt 116 is adapted to extend through passages 114, 90 and 108 of clamp plate 102, mold base section 68 and clamp plate 100, respectively. Nut 118 can be secured to the threaded end portion of bolt 116 so as to removably clamp die 16A between clamp plates 100 and 102.

With respect to materials of the various components shown in FIG. 2, it is preferred that the mounting plate 92, clamp plates 100 and 102, and mold base sections 44 and 68 be constructed of a metal, most preferably a "mild" carbon steel having little or no chromium therein. Preferably, mold insert sections 60 and 82 are also constructed of a metallic material, most preferably a "hot work" steel having a high chromium content. Such a construction using the two different types of steels is particularly advantageous over conventional pultrusion dies which do not have removably mounted mold inserts as in the present invention. By employing the removably mounted mold insert of the present invention, the more expensive hard steel is required only in the mold insert.

One possible sequence of steps for assembling the apparatus shown in FIG. 2 is as follows, although it should be apparent to one skilled in the art that this specific order of assembly steps can be changed in some respects if desired. First, mold base section 68 is connected to mounting plate 92, followed by connection of clamp plate 100 to clamp plate 102 by means of bolt 116 and nut 118 so as to clamp mold base section 68 therebetween. Accordingly, inner face 104 of clamp plate 100 comes into contact with face 70 of mold base section 68, and inner face 110 of clamp plate 102 comes into contact with face 72 of mold base section 68. Mold insert section 82 can now be removably mounted in channel portion 80 by positioning such mold insert section in channel portion 80 and connecting mold insert section 82 to mold base section 68 by means of bolts 74. It is desirable to have a small amount of clearance between the side faces of mold insert section 82 and the inner side faces which define channel portion 80 so as to facilitate easy placement of mold insert section 82 in channel portion 80. Such clearance is preferably on the order of only about 1/1000 inch in order to avoid a significant decrease in heat exchange between mold base section 68 and mold insert section 82. Mold insert section 60 can now be removably mounted in channel portion 58 in a similar manner, followed by positioning of mold base section 44 above mold base section 68 such that mold insert sections 60 and 82 mate along their respective faces and such that alignment pins 64 and 66 are received in corresponding alignment holes in mold insert section 82. Such alignment holes are not shown in FIG. 2 but are shown in subsequent FIG. 12. Mold base section 44 is then connected to mold base section 68 by means of bolts 50.

Mold base section 44 and mold insert section 60 are preferably sized so as to leave a small (i.e. on the order of 1/1000 inch) clearance between mold base section 44 and mold base section 68. This ensures that mold insert section 60 is firmly urged against mold insert section 82 so as to mate therewith in the correctly aligned position by means of alignment pins 64 and 66. It is also desirable to size mold base section 44 to have a width as measured between faces 46 and 48 which is slightly (i.e. on the order of 1/100 of inch) less than the distance between clamp plates 100 and 102 as measured between inner faces 104 and 110. Sizing mold base section 44 in this manner facilitates insertion and removal of mold base section 44 between clamp plates 100 and 102 in their clamped position. An alternate means of facilitating such insertion and removable of mold base section 44 could include providing a very slight taper, or "draft angle", of faces 46 and 48 so as to diverge from a width at the lower end of mold base section 44 to a larger width at the upper end of mold base section 44. Such a draft angle would typically be about 89° with respect to the upper face of mold base section 44.

Figure 3:
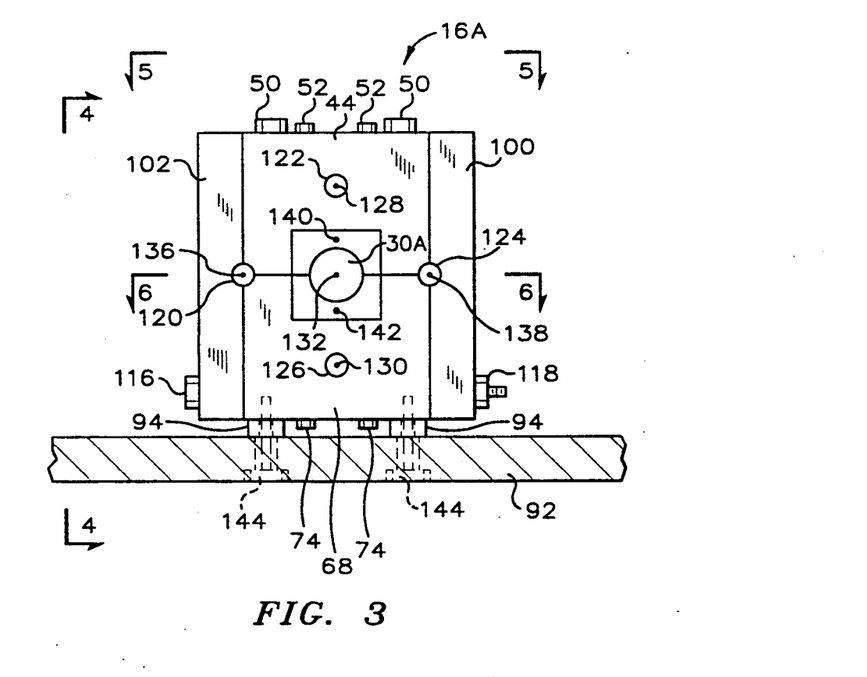
FIG. 3 is an end view of the apparatus of FIG. 2 in its assembled form.

Referring now to FIG. 3, there is shown the apparatus of FIG. 2 in its completely assembled form. As shown, die 16A has a pair of outer faces (48 and 72 in FIG. 2) as defined by mold base sections 44 and 68, wherein at least one outer face (i.e. face 72 in FIG. 2) is in contact with the inner face of clamp plate 102. Die 16A has an additional opposing pair of outer faces (faces 46 and 70 in FIG. 2) which are also defined by mold base sections 44 and 68, wherein at least one of such outer faces (i.e. face 70 in FIG. 2) contacts the inner face of clamp plate 100. As noted previously, it is desirable to have a very slight clearance between the outer faces defined by mold base section 44 and the inner faces of the clamp plates which is not shown in FIG. 3 due to the extremely small dimensions involved. Other similar clearances between various faces discussed above are also not shown in FIG. 3.

The apparatus in its assembled form as shown in FIG. 3 defines a plurality of passages 120, 122, 124 and 126. Such passages are for receiving heat elements which are not shown in FIG. 3. Passages 122 and 126 extend through mold base sections 44 and 68, respectively, and have corresponding longitudinal axes 128 and 130. Longitudinal axes 128 and 130 are positioned so as to generally define a plane which intersects longitudinal axis 132 of mold cavity 30A. Mold cavity 30A is defined by respective mold cavity portion 62 and 84, which are shown in FIG. 2. Passages 120 and 124 are defined by the semi-circular and quarter circular passages shown in FIG. 2 so as to extend through the mold base sections and clamp plates. Passages 120 and 124 have corresponding longitudinal axes 136 and 138 which generally define a plane which also intersects longitudinal axis 132 and which is generally perpendicular to the plane defined by longitudinal axes 128 and 130.

The two mold insert sections respectively define passages 140 and 142, closely adjacent to mold cavity 30A, for receiving thermocouples therein. Such thermocouples can monitor the temperature of the mold insert sections and can be used in conjunction with suitable control equipment to automatically control the temperature of die 16A.

Finally with respect to FIG. 3, die 16A is connected to mounting plate 92 by means of bolts 144, shown in broken lines, which are threadedly received in mold base section 68. Bolts 144 are received through oversized holes, also shown in broken lines, which permit slight adjustments of the position of die 16A in the alignment process. Furthermore, bolts 144 are preferably recessed in the bottom of mounting plate 92.

Figure 4:
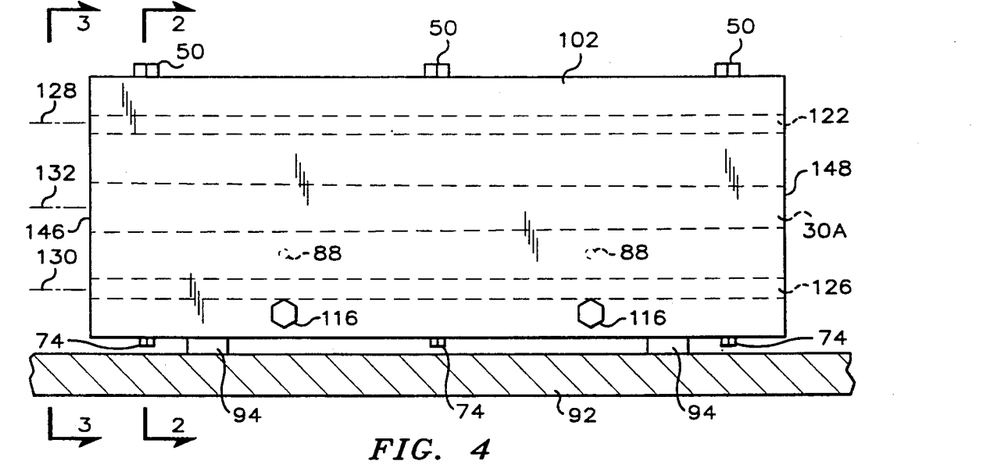
FIG. 4 is a side view of the assembled apparatus shown in FIG. 3 as viewed along line 4—4.

Referring now to FIG. 4, a side view of the FIG. 3 apparatus shows mounting plate 92, clamp plate 102, bolts 50, 74 and 116, feet 94 and alignment holes 88 in broken lines. Bolts 52 cannot be seen in this side view. Also shown in broken lines are passages 122 and 126, having corresponding longitudinal axes 128 and 130, and also mold cavity 30A, having longitudinal axis 132 which extends completely through the mold insert of die 16A from inlet end 146 to outlet end 148. It can be seen from FIG. 4 that longitudinal axes 128 and 130 of passages 122 and 126 are generally parallel to axis 132 of mold cavity 30A.

Figure 5:
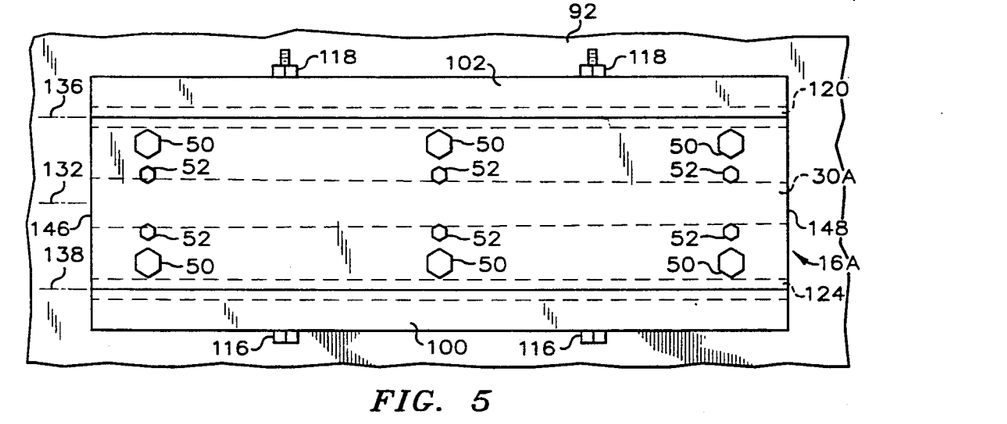
FIG. 5 is a top view of the assembled apparatus shown in FIG. 3 as viewed along line 5—5.

Referring now to FIG. 5, a top view of the apparatus of FIG. 3 shows the upper surface of mounting plate 92, mold base section 44, each of clamp plates 100 and 102, bolts 50, bolts 52, bolts 116 and nuts 118. Bolts 74 are not visible in this view but are positioned directly underneath the positions of bolts 52. Also shown in broken lines are passages 120 and 124 having corresponding longitudinal axes 136 and 138. It can be seen from FIG. 5 that longitudinal axis 132 of mold cavity 30A is also parallel to longitudinal axes 136 and 138 of passages 120 and 124. It is also apparent from FIG. 5 that the inner faces of clamp plates 100 and 102 and the outer faces of die 16A as defined by the mold base sections are generally parallel to longitudinal axis 132 of mold cavity 30A.

Figure 6:
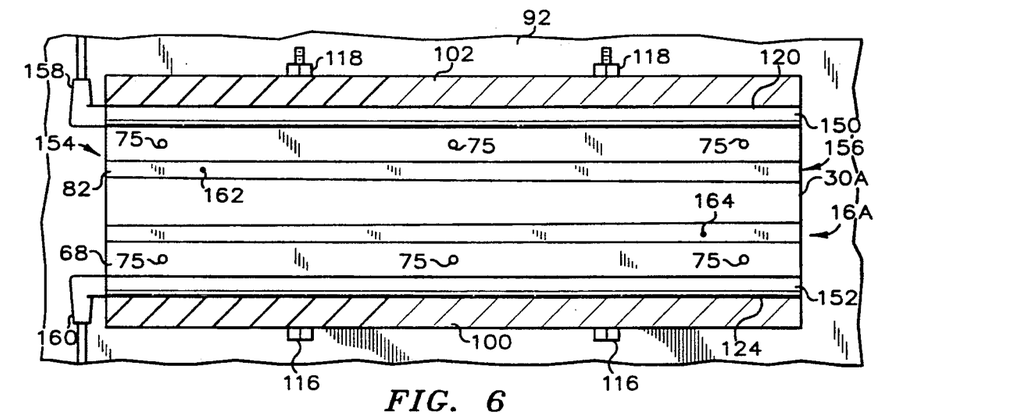
FIG. 6 is a view of the assembled apparatus of FIG. 3 as viewed along line 6—6 with heating elements in their operating position.

Referring now to FIG. 6, this view of the apparatus of FIG. 3 as viewed along line 6—6 shows a cross section of clamp plates 100 and 102 and their connecting means, bolts 116 and nuts 118. FIG. 6 additionally shows heating elements 150 and 152 as they would be positioned during operation of the apparatus. Such heating elements are preferably electrical resistance rod heaters which extend from upstream end 154 of mold base section 68 to downstream end 156 of mold base section 68. Connector/cable lead assemblies 158 and 160 are also shown as being connected to heating elements 150 and 152, respectively. FIG. 6 additionally shows the upper surface of mold base section 68 having holes 75 therein. As discussed with respect to FIG. 1, holes 75 are threaded and adapted to receive bolts 50 therein. The view in FIG. 6 assumes that bolts 50 are removed. Alignment holes 162 and 164 are provided in mold insert section 82 for the purpose of receiving alignment pins 64 and 66 (see FIG. 1) therein. The lower half of mold cavity 30A, indicated as mold cavity portion 84 in FIG. 2, is shown as being defined by mold insert section 82.

Although heating elements are not shown as being actually positioned in passages 122 and 126, it should be apparent that heating elements can be positioned in such passages in a similar manner to that shown in FIG. 6.

In regard to the orientation of the passages which receive the heating elements, it has been found that the heating element passages positioned as illustrated and described above provide very uniform heating of all parts of mold cavity 30A. This enables a faster line speed than is possible with conventional heating element passage orientations where the longitudinal axes of such passages are generally perpendicular to the longitudinal axis of the mold cavity.

Figure 7:
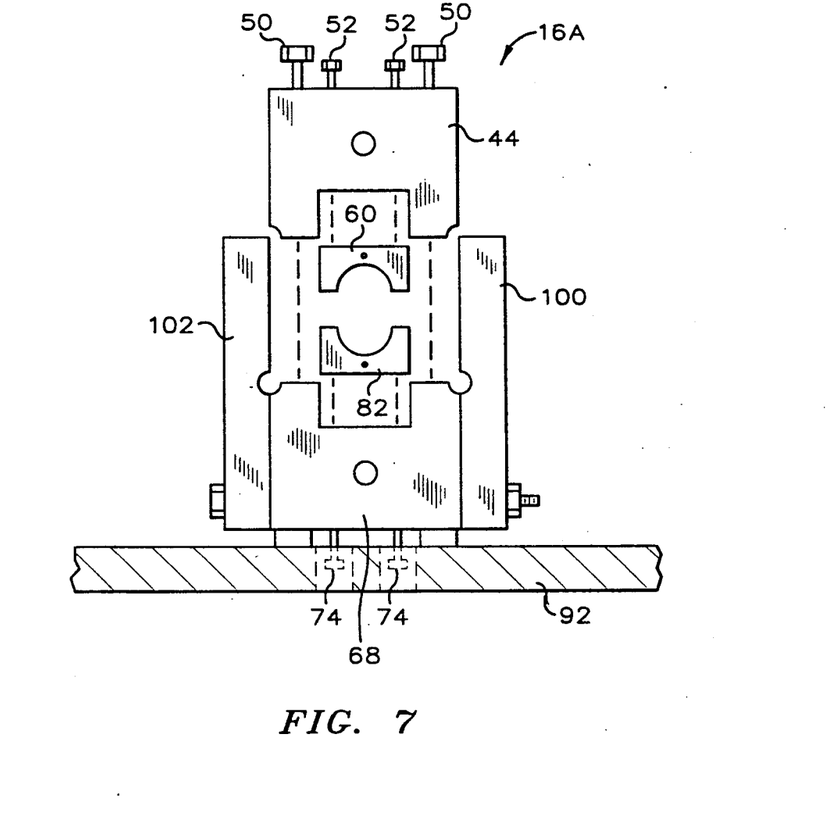
FIG. 7 is an end view which illustrates the manner in which the apparatus shown in the previous FIGURES is disassembled for replacement of a mold insert.

Referring now to FIG. 7, this end view illustrates the manner in which die 16A can be disassembled to replace its mold insert. With clamp plates 100 and 102 in their clamped position, mold base section 44 is disconnected from mold base section 68 by removing bolts 50 from their respective threaded holes in mold base section 68. Mold insert section 60 is disconnected from mold base section 44 by appropriately removing bolts 52 and mold insert section 82 is disconnected from mold base section 68 by similarly removing bolts 74. New mold insert sections, defining a different shaped or sized mold cavity therebetween, can now be easily connected to mold base sections 44 and 68 by means of bolts 52 and 74, respectively. Mold base section 44 is then reconnected to mold base section 68 by means of bolts 50.

Figure 8:
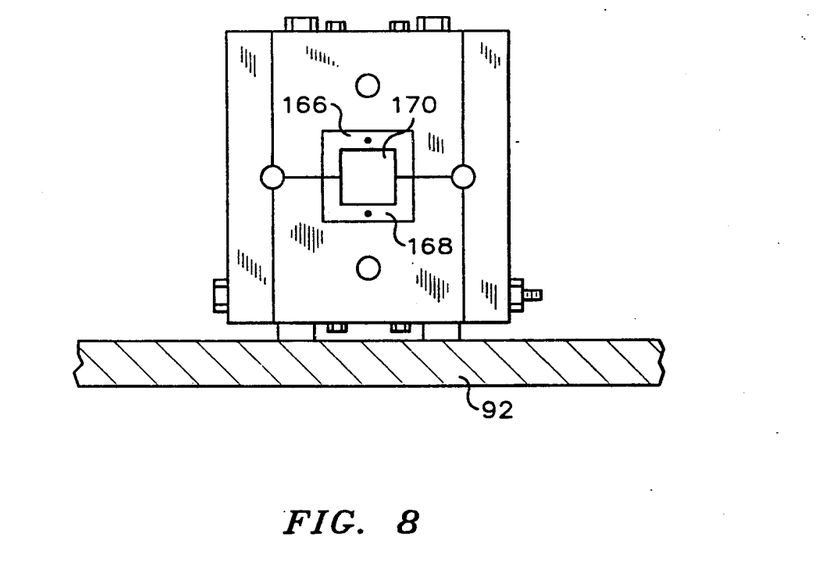
FIG. 8 is an end view which shows the apparatus of FIG. 7 in its assembled form with a replacement mold insert.

Referring to FIG. 8, new mold insert sections 166 and 168 are shown as having replaced mold insert sections 60 and 82. By way of example, mold insert sections 166 and 168 are shown as defining a mold cavity having a square cross section rather than a circular cross section.

It should be noted that the mold insert sections are easily changeable with minimal disassembly of the apparatus. Note, for example, that mold base section 68 need not be removed from mounting plate 92, and clamp plates 100 and 102 need not be disconnected from their clamped position around die 16A. Thus, a minimum amount of time and labor is required to make a change in the mold cavity. It is particularly advantageous to have such a changeable mold cavity since this avoids the expense of making an entirely new die for each different mold cavity which is desired.

Figure 9:
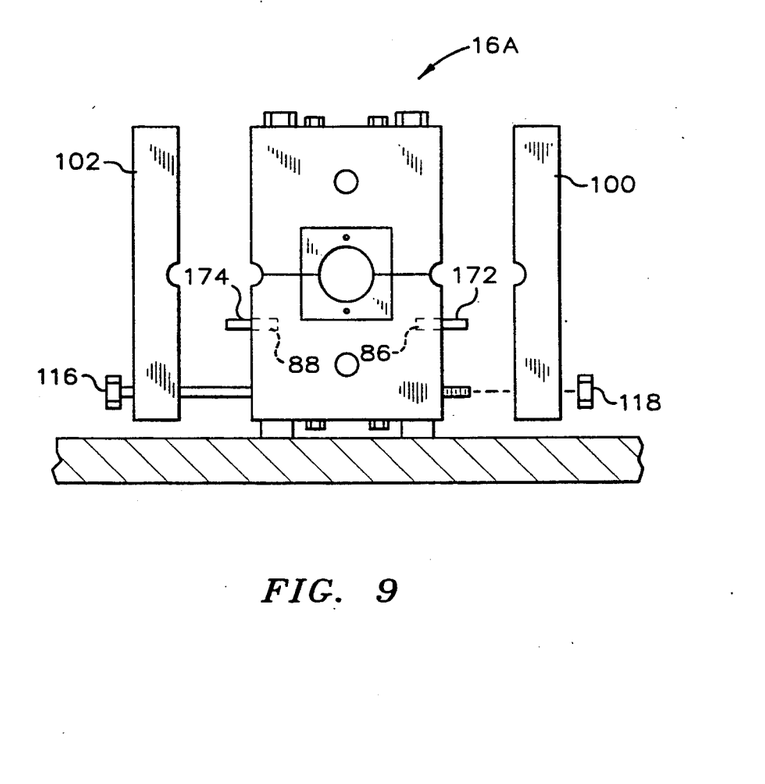
FIG. 9 is an end view of the manner in which the apparatus as shown in FIGS. 1-6 is disassembled to add additional dies between the clamp plates.

Referring now to FIG. 9, there is shown the manner in which the apparatus is disassembled to add additional dies. Clamp plates 100 and 102 are disconnected by means of removing nut 118 from the threaded end portion of bolt 116 as illustrated. Alignment pins 172 and 174 are snugly fitted within holes 86 and 88, respectively.

Figure 10:
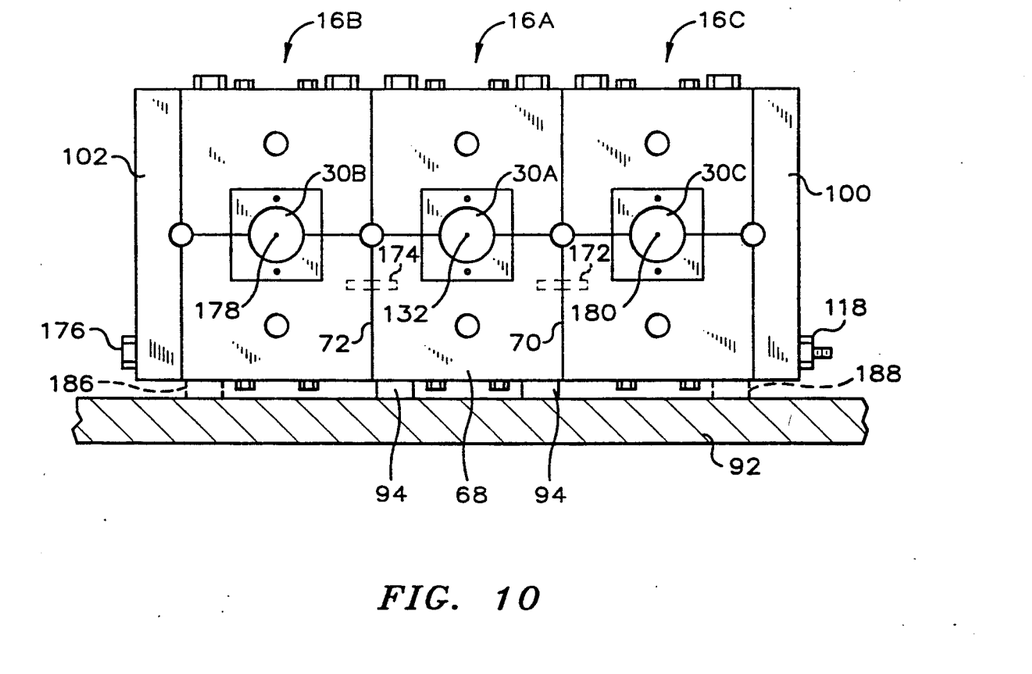
FIG. 10 is an end view which illustrates such additional dies as clamped between the clamp plates.

Referring to FIG. 10, it can be seen that additional dies 16B and 16C, also having corresponding mold inserts and mold cavities defined therethrough, are positioned adjacent to and on each side of die 16A such that face 70 of mold base section 68 contacts a face defined by the lower mold base section of die 16C, and face 72 of mold base section 68 contacts a face as defined by the lower mold base section of die 16B. The faces of the upper mold base sections do not have to necessarily contact one another. As noted previously, there is preferably a slight clearance between such faces. In positioning dies 16A, 16B and 16C as described above, alignment pins 172 and 174 are inserted into corresponding alignment holes in the lower mold base sections of dies 16C and 16B. This facilitates easy and precise positioning of the various dies adjacent to one another. Dies 16A, 16B and 16C are clamped together between clamp plates 100 and 102 by replacing bolt 116 with a longer bolt 176 and tightening nut 118 against clamp plate 100.

It can be seen from FIG. 10 that longitudinal axes 132, 178 and 180 corresponding to mold cavities 30A, 30B and 30C of the respective dies are generally parallel to and spaced from one another. It can also be seen from FIG. 10 that longitudinal axes 132, 178 and 180 generally define a plane which is generally perpendicular to the inner faces defined by clamp plates 100 and 102 and to the various faces defined by the mold base sections of dies 16A, 16B and 16C.

In particular, it should be noted that clamping together dies 16A, 16B and 16C in accordance with the invention automatically aligns dies 16B and 16C, assuming die 16A has previously been aligned. This is due to the abutting contact of faces of dies 16B and 16C with faces 70 and 72 of die 16A. Such automatic alignment of dies 16B and 16C avoids the necessity of the time consuming procedure of aligning each of these dies. Furthermore, it should be noted that dies 16B and 16C have been added without having to make any further connections to mounting plate 92. Adding additional dies, however, will typically require additional connections to mounting plate 92. If desired, additional feet 186 and 188, as shown in broken lines, can be positioned under dies 16B and 16C, respectively, simply for support. Extending a bolt through each of such feet for connection to dies 16B and 16C will typically not be necessary.

Die set 18 (FIG. 1) is constructed similarly to die set 16 as previously described, except that die set 18 has at least one mold cavity 32 shaped and sized as shown in FIG. 1.

Figure 11:
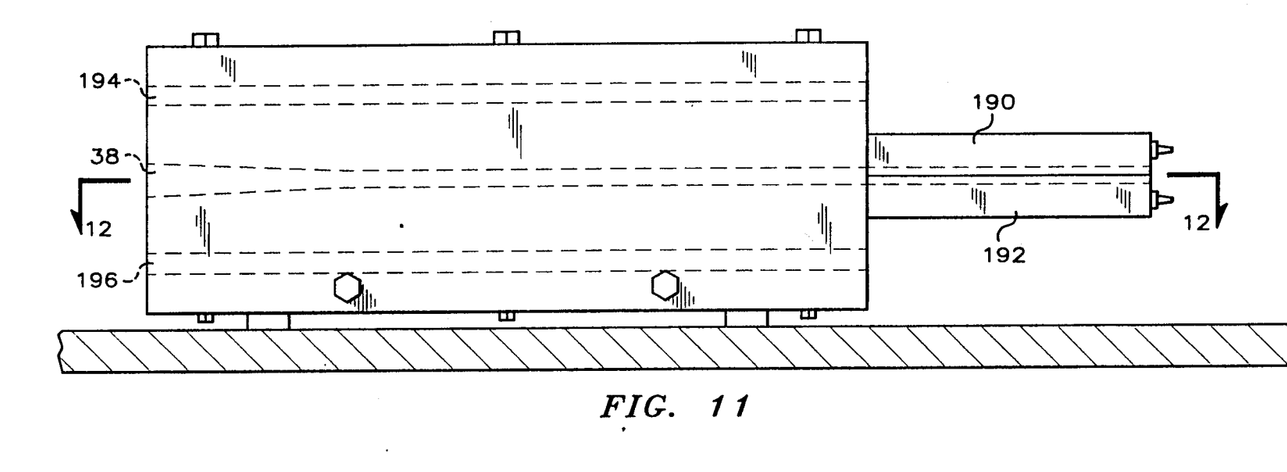
FIG. 11 is a side view of an apparatus which includes the third cooling die set.

Referring to FIG. 11, there is shown a side view of an apparatus in accordance with die set 22 (FIG. 1) which is similar to that shown in FIG. 4, except for a different shape and size of mold cavity 38 as has previously been described with reference to FIG. 1. FIG. 11 also differs from FIG. 4 insofar as its mold insert as defined by mold insert sections 190 and 192 extends beyond the downstream end of its corresponding mold base. FIG. 11 also shows heating element passages 194 and 196 which are oriented similarly to that shown in FIG. 4.

Figure 12:
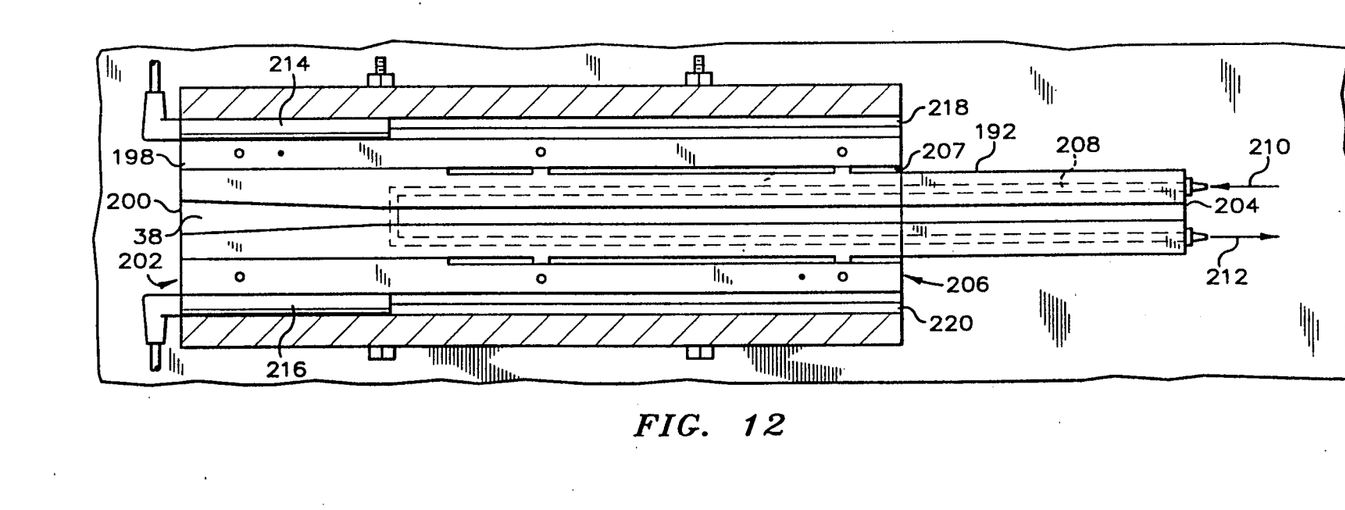
FIG. 12 is a view of the apparatus of FIG. 11 as viewed along line 12—12 with heating elements in their operating position.

Referring to FIG. 12, mold insert section 192 and its corresponding mold base section 198 of a single die are shown. Mold insert section 192 extends from its inlet end 200, which is substantially flush with the upstream end 202 of mold base section 198, to its outlet end 204 beyond the downstream end 206 of mold base section 198. Air gaps, as indicated at for example 207, are preferably provided between mold insert section 192 and mold base section 198 along side the constant cross-sectional portion of mold cavity 38. It is along this portion of mold cavity 38 that cooling of the pultruded article is desired. Air gaps 207 facilitate such cooling.

The cooling effect is further enhanced by a coolant fluid passage 208, shown in broken lines, which is separate from mold cavity 38 and which longitudinally extends through mold insert section 192 from a first end adjacent to the smaller end of the tapered portion of mold cavity 38 to a second end at the outlet end 204 of mold insert section 192. Coolant fluid enters passage 208 as indicated at 210 and travels through passage 208 and to and through a coolant fluid outlet as indicated at 212.

Finally with respect to FIG. 12, it is preferable that heating elements 214 and 216 as positioned in respective passages 218 and 220 extend only from the upstream end 202 of mold base section 198 to a position longitudinally adjacent to the smaller diameter end of the tapered portion of mold cavity 38.

Mold insert section 190 (FIG. 11) and its corresponding mold base section is constructed similarly to mold insert section 192 and mold base section 198.

A cooling die set in accordance with the design shown in FIGS. 11 and 12 optimizes cooling of the pultruded article after final consolidation takes place in the tapered portion of the mold cavity. This decreases the necessary length of the cooling die set and therefore enhances production efficiency. Conversely, for a given length of the cooling die set, achievable line speeds are increased.

EXAMPLE

The purpose of this example is to demonstrate the pultrusion of high quality rods using certain preferred aspects of the invention described above. This example should not be construed to limit the invention in any manner.

The apparatus of this example employed an arrangement substantially as shown in FIG. 1 wherein each of die sets 16, 18 and 22 included a single die. "Hot" dies 16 and 18 were constructed substantially in accordance with FIGS. 2–6 whereas "cooling" die 22 was constructed substantially in accordance with FIGS. 11 and 12. The mold base of each die was composed of 1018 steel alloy and the mold inserts were composed of H13 steel alloy. The clamp plates associated with each die were also composed of the 1018 steel alloy. Four 750 watt cartridge heaters, having individual lengths and diameters of 8 inches and $\frac{1}{2}$ inch, respectively, were positioned in each of dies 16 and 18 in the manner illustrated in FIG. 6. Die 22 employed four 250 watt cartridge heaters positioned substantially as shown in FIG. 12, wherein each such heater was of the same diameter as heaters in dies 16 and 18 but had a length of only 3 inches. Other important dimensions of the apparatus are summarized in Table I.

TABLE I

| Item | Dimension |
| --- | --- |
| Length of mold cavity 30 | 8 inches |
| Inlet diameter of mold cavity 30 | 1.500 inches |
| Outlet diameter of mold cavity 30 | 0.690 inch |
| Length of mold cavity 32 | 8 inches |
| Length of tapered portion 34 | 7 inches |
| Length of portion 36 of constant cross section | 1 inch |
| Inlet diameter of mold cavity 32 | 0.776 inch |
| Outlet diameter of mold cavity 32 | 0.532 inch |
| Length of mold cavity 38 | 12 inches |
| Length of tapered portion 40 | 2 inches |
| Length of portion 42 of constant cross section | 10 inches |

TABLE I-continued

| Item | Dimension |
| --- | --- |
| Inlet diameter of mold cavity 38 | 0.576 inch |
| Outlet diameter of mold cavity 38 | 0.506 inch |

The puller 26 employed in this example was a Pulster 3008 pulling machine commercially available from Pultrusion Technology, Inc. of Twinsburg, Ohio. This pulling machine includes two grippers for pulling the pultruded article.

A number of runs were made to determine the optimum line speed achievable with this particular apparatus. The resin impregnated fibers were supplied to the inlet of die 16 as 57 to 60½ inch wide and 0.007 inch thick AVTEL® unidirectional prepreg tapes (available from Phillips 66 Company of Bartlesville, Okla. comprising approximately 70 weight percent glass fibers and 30 weight percent RYTON® poly(phenylene sulfide). The temperatures of hot dies 16 and 18 were maintained at about 375° C., as measured at their respective outlets, whereas a temperature differential was maintained between the inlet (about 150° C.) and outlet (about 25° C.-30° C.) of die 22 by means of the design illustrated in FIG. 12. Water was used as the coolant fluid in die 22.

The runs demonstrated that a line speed of between about 10 and about 11 inches/minute produced a high quality pultruded ¼ inch diameter rod without visible voids and splits, and which was cooled sufficiently upon exit from cooling die 22 to avoid deformation. The excellent line speed achieved in pultruding the ¼ inch diameter rod is believed to be attributable to the highly uniform heating of the resin impregnated fibers by the longitudinally positioned heaters and to the highly effective cooling of the consolidated resin impregnated fibers in cooling die 22.

Similar runs were made, employing a shorter (about 8 inches) cooling die mold cavity, to pultrude ¼ and 3/16 inch diameter rods from AVTEL® tapes (comprising RYTON® and carbon fibers) at line speeds of 25.2 and 38.7 inches/minute, respectively. In these runs, the mold insert did not extend beyond the end of its corresponding mold base (as is shown in FIG. 12), but instead had the same length as the mold base.

That which is claimed is:

1. A molding method comprising:
    (a) assembling a die set comprising at least one die by positioning, with respect to any one die of said die set, first and second mold base sections relative to one another so as to form a mold base defining a channel therethrough in which a mold insert, having an inlet end and an outlet end and defining a mold cavity which extends completely therethrough from said inlet end to said outlet end, is removably mounted in a mounted position, whereby the thus assembled die set comprising said at least one die defines at least one corresponding mold cavity;
    (b) removably clamping said die set between a first clamp member and a second clamp member in a clamped position so as to allow removal of one of said mold base sections of any one die of said die set from between said first and second clamp members while in said clamped position; and
    (c) passing resin impregnated fibers, after steps (a) and (b), through said at least one mold cavity from said inlet end to said outlet end so as to at least partially consolidate the resin impregnated fibers.

2. A method as recited in claim 1 wherein said first and second clamp members comprise first and second clamp plates and wherein said clamping step (b) comprises removably connecting said first clamp plate to said second clamp plate so as to clamp said die set therebetween.

3. A method as recited in claim 2 wherein said mold insert comprises a first mold insert section and a second mold insert section and wherein said assembling step (a) includes mating said first and second mold insert sections with one another in a mated position.

4. A method as recited in claim 3 wherein said first mold base section defines a first channel portion and said second mold base section defines a second channel portion, and wherein said assembling step (a) includes positioning said first mold insert section in said first channel portion and removably connecting said first mold insert section to said first mold base section, and positioning said second mold insert section in said second channel portion and removably connecting said second mold insert section to said second mold base section.

5. A method as recited in claim 4 wherein said first mold insert section has at least a first face which has an alignment pin extending therefrom and said second mold insert section has at least a second face which has a hole therethrough, wherein in mating said first and second mold insert sections in said assembling step said first face mates with said second face so that said alignment pin is aligned with and received within said hole.

6. A method as recited in claim 5 wherein said assembling step (a) includes removably connecting said first mold base section to said second mold base section.

7. A method as recited in claim 6 wherein said die set has a first pair of outer faces defined by said first and second mold base sections of a mold base of said die set and a second pair of outer faces defined by said first and second mold base sections of a mold base of said die set, and wherein said first clamp plate has a first inner face and said second clamp plate has a second inner face, and further wherein said clamping step (b) is carried out such that said first inner face contacts at least one outer face of said first pair of outer faces and said second inner face contacts at least one outer face of said second pair of outer faces in said clamped position.

8. A method as recited in claim 7 wherein said at least one mold cavity has at least one corresponding longitudinal axis and wherein said assembling and clamping steps (a) and (b) are carried out such that, in said mounted and clamped positions, said first and second pairs of outer faces are generally parallel to said at least one longitudinal axis.

9. A method as recited in claim 8 further comprising the following steps with respect to a die of said die set which are performed with said first and second clamp members in said clamped position: disconnecting said first and second mold base sections; disconnecting said first mold insert section from said first mold base section and said second mold insert section from said second mold base section; and reassembling said die in accordance with assembling step (a) employing a replacement mold insert.

10. A method as recited in claim 8 wherein said die set comprises a plurality of dies and a plurality of corresponding mold inserts which define a plurality of mold cavities therethrough.

11. A method as recited in claim 10 wherein each die has one pair of faces defined by said first and second mold base sections and another opposing pair of faces also defined by said first and second mold base sections, said die set comprising at least one adjacent pair of first and second dies, wherein said method comprises positioning, before and during said clamping step (b), said dies such that the mold base of said first die has at least one face of a pair of its faces in contact with at least one face of a pair of faces of said second die, and further wherein said contacting faces of said first and second dies are other than said outer faces.

12. A method as recited in claim 11 wherein said dies are positioned and clamped together such that the longitudinal axes of said mold cavities are generally parallel to and spaced from one another.

13. A method as recited in claim 12 wherein said dies are positioned and clamped together such that said longitudinal axes of said mold cavities are oriented to generally define a plane which is generally perpendicular to each of said pairs of faces, including said first and second pairs of outer faces, and also to said first and second inner faces.

14. A method as recited in claim 2 further comprising: disconnecting said first and second clamp members after steps (a) and (b); positioning at least one additional die, having opposing pairs of faces, adjacent to at least one other die, also having opposing pairs of faces, so that at least one face of a pair of faces of said at least one additional die is in contact with at least one face of a pair of faces of said at least one other die; reclamping said die set with said at least one additional die between said first and second clamp members.

15. A method as recited in claim 1 wherein said mold cavity of said one die has a longitudinal axis and said mold base of said one die has extending therethrough at least one passage having at least one longitudinal axis which, in said mounted position, is generally parallel to the longitudinal axis of said mold cavity, said method further comprising: providing at least one heating element in said at least one passage; generating heat from said at least one heating element after steps (a) and (b) but during step (c).

16. A method as recited in claim 15 wherein said at least one passage comprises a plurality of passages and wherein heat is generated from heating elements as positioned in first and second passages whose longitudinal axes generally define a plane which intersects the longitudinal axis of said mold cavity, and wherein heat is further generated from heating elements as positioned in third and fourth passages whose longitudinal axes generally define a second plane which intersects the longitudinal axis of said mold cavity and which is generally perpendicular to said first plane.

17. A method as recited in claim 1 wherein said die set is hereafter referred to as a first die set and wherein there is further provided a second die set which is also assembled and clamped in accordance with steps (a) and (b), said method further comprising: positioning said second die set to receive said resin impregnated fibers after having passed through said first die set in accordance with step (c); and passing the resin impregnated fibers after step (c) through said second die set.

18. A method as recited in claim 17 wherein there is further provided a third die set which is assembled and clamped in accordance with steps (a) and (b), said method further comprising: positioning said third die set to receive resin impregnated fibers after having passed through said second die set; passing said resin impregnated fibers through said third die set.

19. A method as recited in claim 18 further comprising heating each of said first, second and third die sets during passage of resin impregnated fibers therethrough.

20. A method as recited in claim 19 wherein the mold insert of any one die of said third die set has a longitudinal axis and a passage defined therethrough which is separate from said mold cavity and which, in said mounted position, extends generally longitudinally from a first end spaced from the inlet end of said mold insert of said third die set to a second end at the outlet end of said mold insert of said third die set, said method further comprising passing a flow of coolant fluid through said passage.

21. A method as recited in claim 20 wherein said resin of said resin impregnated fibers comprises a poly(arylene sulfide).

22. A method as recited in claim 21 wherein said resin comprises poly(phenylene sulfide).

23. A method as recited in claim 22 wherein said first die set is heated to a temperature in the range of about 310° C. to about 400° C., said second die set is heated to a temperature of about 310° C. to about 400° C., and said inlet end of said mold insert of said third die set is maintained at a temperature in the range of about 130° C. to about 200° C. and the outlet end of said mold insert of said third die set is maintained at a temperature in the range of about 20° C. to about 100° C.

24. A method as recited in claim 1 wherein said resin impregnated fibers are pulled through said at least one mold cavity in step (c).

25. A method as recited in claim 1 further comprising fixedly connecting said die set before step (c) to a mounting plate.

26. A method as recited in claim 25 wherein said die set comprises a plurality of dies, wherein only some of which are fixedly connected to said mounting plate.

27. A method as recited in claim 1 wherein said resin of said resin impregnated fibers comprises a poly(arylene sulfide).

28. A method as recited in claim 27 wherein said resin comprises poly(phenylene sulfide).

29. A method as recited in claim 27 wherein said fibers are selected from the group consisting of glass fibers, carbon fibers and aramid fibers.

30. A method comprising:
(a) providing a die set comprising at least one die, wherein any one die of said die set comprises first and second mold base sections positioned relative to one another so as to form a mold base defining a channel therethrough in which a first mold insert, having a mold cavity defined therethrough, is removably mounted;
(b) providing first and second clamp members which clamp said die set therebetween in a clamped position;
(c) after steps (a) and (b), replacing said first mold insert of any one die of said die set with a second mold insert, also having a mold cavity defined therethrough, while said first and second clamp members are in said clamped position, by (i) removing one of said mold base sections of said one die of said die set from between said first and second clamp members, thereafter (ii) removing said first mold insert from its mounted position, and thereafter (iii) removably mounting said second mold insert and repositioning said mold base sections of said one die of said die set so as to have said second mold insert in said mounted position.

31. A method as recited in claim 30 wherein after step (c) said die set comprising said at least one die defines at least one corresponding mold cavity having an inlet end and an outlet end, and further comprising step (d) of passing resin impregnated fibers, after step (c), through said at least one mold cavity from said inlet end to said outlet end so as to at least partially consolidate the resin impregnated fibers.

* * * * *